United States Patent [19]

Lim

[11] Patent Number: 4,740,085
[45] Date of Patent: Apr. 26, 1988

[54] SCALE FACTOR STABILITY CONTROL

[75] Inventor: Wah L. Lim, Anaheim, Calif.

[73] Assignee: Northrop Corporation, Hawthorne, Calif.

[21] Appl. No.: 830,438

[22] Filed: Feb. 18, 1986

[51] Int. Cl.[4] .............................................. G01C 19/64
[52] U.S. Cl. ...................................... 356/350; 372/94; 372/29
[58] Field of Search ...................... 356/350; 372/29, 94

[56] References Cited

U.S. PATENT DOCUMENTS

| | | | |
|---|---|---|---|
| 3,323,411 | 6/1967 | Killpatrick | 356/350 |
| 3,697,181 | 10/1972 | Macek et al. | 356/350 |
| 4,422,762 | 12/1983 | Hutchings et al. | 356/350 |
| 4,551,021 | 11/1985 | Callaghan et al. | 356/350 |

FOREIGN PATENT DOCUMENTS 75707 4/1983 European Pat. Off. ............ 356/350

Primary Examiner—Vincent P. McGraw
Attorney, Agent, or Firm—Terry J. Anderson; Robert B. Block

[57] ABSTRACT

In a ring laser gyroscope the sum and the difference of the two opposed beam intensities is utilized, in a first implementation, to correct gain non-linearity, and in a second implementation, to adjust tuning mirror positions to minimize non-linear gain output. In a third implementation one or two external mirrors can be used to feed back into the cavity to produce linear gain output, again using the sum and difference of the two opposed beam and the phase angle between the two beams. Accordingly, the sum and the difference of the beam intensities and their phase angle is used to compensate for the laser gain and loss dependent terms and for the back-scattering terms which heretofore have been caused errors in the readout.

2 Claims, 2 Drawing Sheets

SCALE FACTOR STABILITY CONTROL

BACKGROUND OF THE INVENTION

1. Field of the Invention

The present invention relates to ring laser gyroscopes, and more particularly to compensation techniques for correcting error factors therein.

2. Description of the Prior Art

Ring laser gyroscopes have been known in the past. Typically, such gyroscopes take the form of a closed resonating cavity into which two oppositely directed beams are inserted. As the cavity is rotated in inertial space the effective lengths of the opposite beam paths are lengthened and shortened. In consequence the resonating frequencies of the two beams become unequal to produce frequency beats indicating the rotation. Ideally, this beat frequency should be linear with the rotation rate of the ring laser, i.e., the ring laser is thus ideally considered to be a linear angular rate measuring instrument.

In the past, most if not all of the work in laser gyroscopes relied on the assumption that the two beam intensities of the instrument are substantially equal. (See, for example, the article by R. L. Fork and, M. A. Pollack appearing in 1965, Physics Review, A139, 1408). More recently, this assumption has received less favor. Specifically, the proposition of equal beam losses has been abandoned and corrections for backscattering differentials has been expressed in terms of intensity—phase interaction called "winking," a term associated with periodic beam intensity peaks occurring close to the null point or the lock-in threshhold. Thus, intensity differentials have been recognized in the past, however, in association with the instrument performance close to its null point.

In this context one should note that the idealized relationships of a laser gyroscope have now been well developed and corrections for some real effects in the instrument are now commonly practiced. These real, physical effects are generally grouped in three error groupings. The first error grouping affects the accuracy of the null point of the ring laser, i.e. the virtual rate output entailed in a stationary laser gyroscope. This error is typically identified as the null shift error or bias.

The second error source, known as the lock-in error, is typically associated with frequency synchronization of the two opposing beams, an effect resulting from the mutual coupling from the opposite traveling waves by scattering energy from one beam onto the direction of the other. This error is analogically similar to the lock-in of a tank circuit when the oscillation of an external injected voltage approaches that of the tank circuit itself. Simply, as the frequency difference between the two oscillations becomes smaller one of the oscillators will lock the other oscillator. It is in this context that most, if not all, the work associated with backscattering and gain/loss ratio has taken place.

The past solution techniques have, in one way or another, corrected the above two errors. For example, the null shift error is taken out by calibration and the lock-in error is often corrected by dither, i.e. swings of the instrument exceeding the lock-in range. Because of these available corrections, little further analytical work has gone on. As a consequence the third source of error, i.e. the error associated with non-linearities in the scale factor of the instrument over the full dynamic range has not been adequately addressed since this error entails an accumulation of a large number of phenomena, and because of the characteristically large dynamic range of the instrument. Thus, the prevailing practice in the past has been directed at the physics of the instrument close to the null point, which has failed to compensate for most scale factor non-linearities.

Accordingly, techniques which conveniently correct the scale factor of a ring laser gyroscope are desired and it is one such technique that is disclosed herein.

SUMMARY OF THE INVENTION

Accordingly, it is the general purpose and object of the present invention to provide a convenient signal pick-off useful to compensate the scale factor errors of a laser gyroscope.

Other objects of the invention are to provide a technique for linearizing the scale factor of a laser gyroscope with minimal measurement inputs.

Yet other objects of the inveniton are to provide a compensation control loop which reshapes the ring laser beam paths to provide completely linear scale factor output.

Briefly, these and other objects are accomplished in the present invention by a technique wherein the sum and the difference of the two opposed beam intensities and their phase difference is compared. In the first implementation the scale factor of the instrument is corrected in response to the beam intensity and in the second implementation the mirror positions are modified to modify the beam path to minimize scale factor non-linearity. Yet in a third implementation external optical feedbacks are used to modify the backscattering to achieve linear scale factor.

The foregoing techniques are based on the discovery that the scale factor of a laser gyroscope follows generally the following relationship:

$$SF = SF_\infty \left[ 1 + \frac{\frac{1}{2}\Omega_s^2}{\Omega^2 + \Omega_g^2} \right]$$

In this expression $\Omega$ is the angular input rate orthogonal to the plane of the laser gyroscope; $SF_\infty$ is the scale factor coefficient or instrument gain; $\Omega_g$ is the gain and loss dependent term and $\Omega_s$ is the term associated with back-scattering effects. This expression has been found valid for angular input rate $\Omega >> \Omega_s$. It has been found that this same expression of the various gain, loss and back scattering effects can be conveniently restated as follows:

$$SF = SF_\infty \left[ 1 + \left(\frac{i}{I}\right)^2 \right]$$

This expression holds true over the full range of the instrument. In this expression i is the amplitude of the difference between the two beams intensities and the I is the average amplitude of the sum. Furthermore, this expression holds true for all laser gain and loss and all backscattering scattering or beam coupling conditions. In general the intensities of the laser beam can be expressed as:

$I_1 = I_{10} + i_1 \sin(\Omega t + 2E)$ and
$I_2 = I_{20} + i_2 \sin(\Omega t + 2E)$ Where $I_{10}$, $I_{20}$ are constants, $i_1$, $i_2$ are the amplitude of the AC term, and I is the phase difference. Thus, by picking off two beam intensities an indirect measurement of the scale factor error is made. This measurement may then be fed to a compensation network at the output of the ring laser gyro to modify the scale factor according to the inverse of the above relationship. In this manner the foregoing errors in scale factor are taken out.

Alternatively, two of the tuning mirrors of the laser cavity can be fixed to electromechanical actuators which move in response to the above ratio of the beam intensity difference and sum. By minimizing the ratio, minimum scale factor non-linearity can be achieved.

This reduction of scale factor non-linearity comes about because backscattering and other laser beam coupling phenomena are vector sum phenomena and the vector sum can be varied by the differetial positioning of the mirrors. The invention is therefore not limited to linear mirror shifting but includes mirror tilt or any other controlled mirror movements.

In considering the present invention one should note that the foregoing relationships accommodate both the contribution due to backscattering and the gain and loss associated terms. The scattering component itself, $\Omega_s$, can be generally set out as follows:

$$\Omega_s = \sqrt{4 \, r^2 \sin^2 E + 4\Delta^2 \cos^2 E}$$

where:

$$r = \frac{r_1 + r_2}{2};$$

$$E = \frac{E_1 + E_2}{2} = \text{the average scattering phase angle; and}$$

$$\Delta = \frac{r_1 - r_2}{2}$$

In this relationship the terms $r_1$ and $r_2$ are the clockwise and counterclockwise scattering amplitudes and E is the phase angle of the scattering.

This relationship can thus be analytically utilized to correct gain non-linearities as result of scattering by constraining to the alternative condition of $\Delta = 0$ and $E = 0$ or $r = 0$ and $E = \pi/2$. By induction, minimizing the beam intensity difference ($I_1 - I_2 \rightarrow \min.$) will produce the same effect on backscattering contribution as on the gain and loss dependent term. By similar approach it can be shown that the phase difference between $I_1$ and $I_2$ is equal to 2 E. One can ideally drive $\Omega_s$ to zero and thereby achieve perfect scale factor linearity.

Accordingly, a control arrangement which minimizes the quantity $I_1 = I_2$ will minimize the contributions due to $\Omega_s$ and $\Omega_g$. This control arrangement, moreover, need not inspect which component is operated on, i.e., whether it is the $\Delta$ that is driven to zero or whether E approaches $\pi/2$, since either condition will compensate the non-linearity. In addition, by utilizing the phase angle E and external adjustable beam feedback, one can completely compensate for non-linearity.

Alternatively, the scale factor can be directly corrected by the beam intensity difference, once again compensating for the scattering and gain and loss dependent terms without the insertion of controls.

These general considerations are available to compensate for scale factor non-linearities according to the description which now follows.

DESCRIPTION OF THE PREFERRED EMBODIMENTS

While the following description sets out in detail three preferred implementations of the invention herein, such are exemplary only. One should note that the circuits implemented herein can be variously laid out and no intent to limit the scope of the invention by the choice of examples is expressed.

Figure 1:
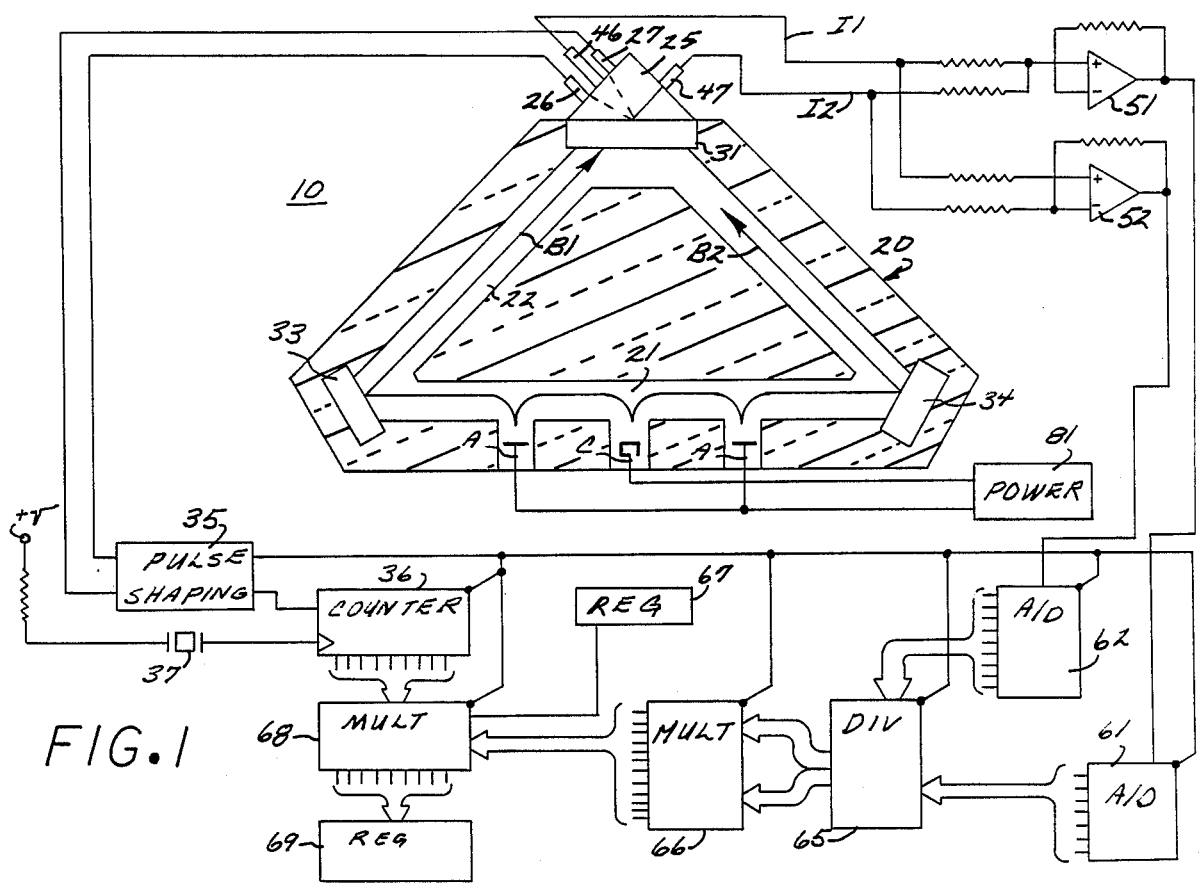
FIG. 1 is a circuit schematic of an inventive compensation system for compensating scale factor non-linearities.

As shown in FIG. 1 the inventive system, according to its first implementation generally designated by the numeral 10, comprises a ring laser 20 typically provided with a gain medium 21 conformed to inject two opposite beams B1 and B2 into a closed resonating cavity 22. In conventional application, such ring lasers are conformed to provide an interference pattern at a surface of a prism 25 which, in response to the gyro platform motion, will produce the beats exhibited a fringe pattern movements. These beats can then be accumulated with time (in the case of an integrating gyro) or may be measured for frequency to determine the angular rotation of the instrument in inertial space.

Accordingly, prism 25 is typically configured to include at least two photo detectors 26 and 27 on one face thereof which detect the passage and polarity of the interference pattern consequent to platform rotation.

Typically such prism 25 is directly mounted to a dielectric mirror 31 which passes a small percentage (often less that 0.1 percent) of the beam energy and it is this beam energy that then sets up the interference pattern at the face of the prism 25 measured for polarity and rate by detectors 26 and 27. The signal outputs of detectors 26 and 27 are then fed to a pulse shaping stage 35 which produces an output signal corresponding in polarity and pulse length to the direction and rate of the platform. This output signal is then fed to an up-down counter 36 clocked by a crystal oscillator 37 and strobed by the trailing edge of the pulse shaping circuit 35. Counter 36 will thus store a binary count corresponding to the beat frequency or rate of the gyro platform.

The foregoing implementation generally describes the typical approach in the art for sensing the platform angular rate. While there are numerous ways of implementing the ring laser into a rate sensing instrument, basically all of these ways rely on direct measurement of the beat frequency to provide a numerical output which is proportional to the rotation. It is this numerical output that is referred to herein as the scale factor SF (or gain) of the instrument and it is the error and non-linearity of this scale factor that are resolved herein.

More specifically, prism 25 may include yet another set of photo detectors 46 and 47 contiguously mounted to the two exposed surfaces thereof which, therefore, sense the intensities of beams B1 and B2. Detectors 46 and 47 produce output signals shown as signals $I_1$ and $I_2$, the amplitude levels thereof corresponding in a linear relationship to the beam intensity.

One should note that the location of detectors 46 and 47 on prism 25 is exemplary only. Without loss of the concept set out herein these detectors can be mounted on any other mirror in the ring laser including mirrors 33 and 34.

Signals $I_1$ and $I_2$ are then collected, in summation, at the input of an operational amplifier 51 and in a differential mode at the input of an operational amplifier 52. These amplifiers then produce the sum of the two intensity signals, shown as signal i. Signals i and I are then respectively converted into digital form by corresponding A to D converters 61 and 62, the output thereof being collected at a divider 65 to produce the ratio of the two signals, shown as signal i/I. This signal is then squared by applying it to both input terminals of a multiplier 66, thereby producing the square of the ratio i over I. Multiplier 66 is then collected with the output of a register 67 having a ratio (i/I) at one input of yet another divider 68 receiving at the other input the output of counter 36. Divider 68 then loads its output into an output register 69 which is periodically strobed for unloading the data.

In the foregoing implementation the output of counter 36 is effectively corrected by a correction factor $[1+(i/I)^2]$, a correction which, as is heretofore set out, compensates for the errors associated with the backscattering and gain and loss dependent terms.

Accordingly, by simply comparing the two beam intensities the substantial sources of error in the scale factor function of the instrument are corrected out in a manner which is conveniently implemented and easily carried out.

Figure 2:
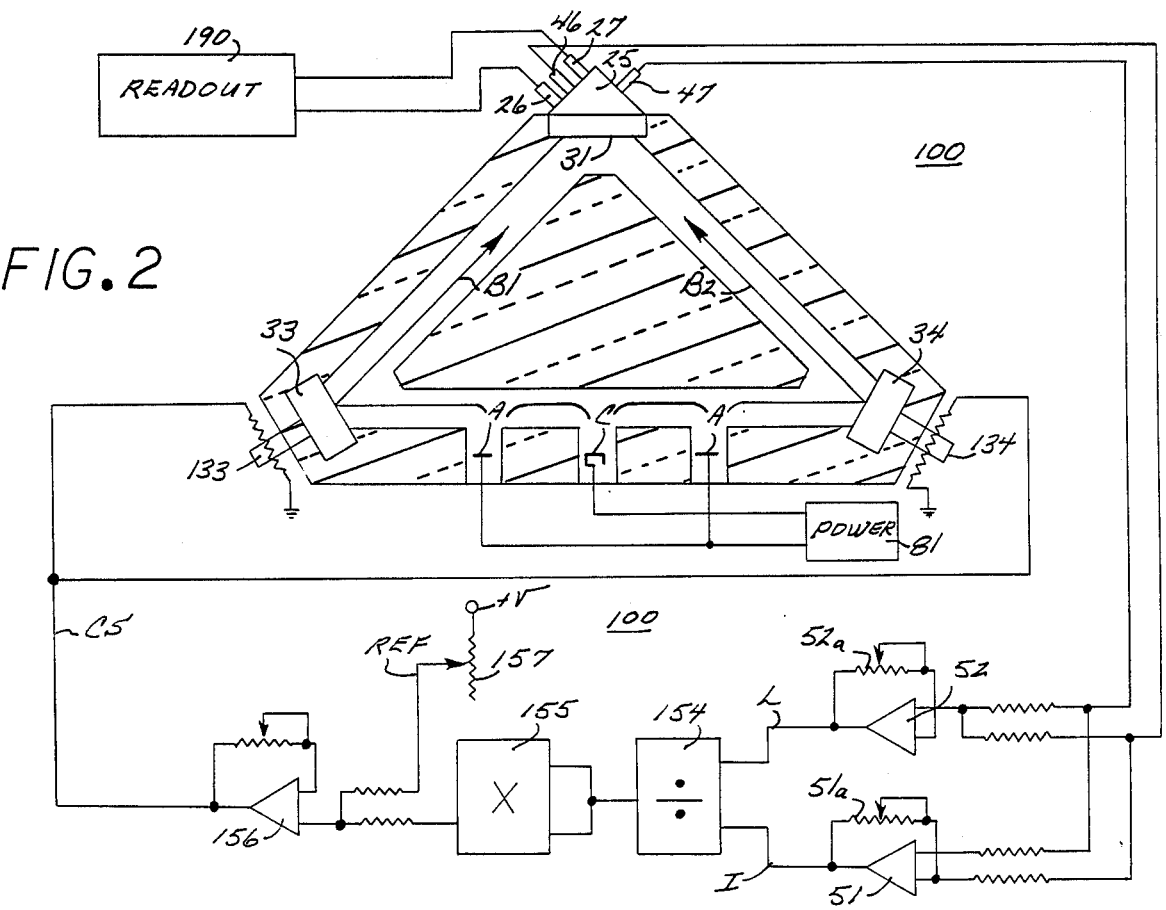
FIG. 2 is yet another schematic illustrating an alternative implementation of an active compensation technique for correcting scale factor non-linearities.

In an alternative implementation, shown in FIG. 2 and generally designated by the numeral 100, and including like components designated by like numbers, a control system is laid out to correct gain non-linearities, once again, by way of the ratio of the beam intensity difference and the intensity sum. More specifically, the ring laser 20 is provided, once again, with the gain medium 21 residing in a leg bounded by two movable mirrors 33 and 34. Mirrors 33 and 34 are mounted on two piezoelectric actuators 133 and 134 connected for common motion in response to a control signal CS.

This control signal originates by operating on the two photoelectric pick-offs 46 and 47, the signal output I1 and I2 from the photoelectric pick-off being fed, again, to operational amplifiers 51 and 52. Once again, amplifiers 51 and 52 issue at the outputs thereof, the aforementioned signals I and i which now are fed to an analog divider 154 which, in turn, squares its output in a multiplier 155. The output of multiplier 155 is, therefore, the square of the signal ratio i/I which is then summed with a reference signal REF at the input with yet another operational amplifier 156. This reference signal REF may be derived at the wiper of a potentiometer 157 connected between signal +V and ground and thus can be adjusted for proper scale with respect to amplifiers 51 and 52. For this purpose amplifiers 51 and 52 may include adjustable feedback resistors 51a and 52a to provide the proper gain ratio. It is this output that has been previously identified as a control signal CS.

Of course the ring laser gyro 20 is again provided with the necessary pick-offs 26 and 27 for detecting the beat frequency, the beat frequency being this time corrected by the fore and aft translation of mirrors 33 and 34. Accordingly, a control system is thus devised which is based on the signal ratio of the beam intensity difference over the beam intensity sum which then drives the geometric alignment of the beams to compensate the output (readout) 190 for errors associated with backscattering and gain and loss contribution.

One should note that both implementations of hearing laser include the necessary power source 81 connected across the anodes and the cathodes respectively shown as A and C within the gain medium 121 and appropriate dither mounts or other implementation are included to correct the well known null errors.

Figure 3:
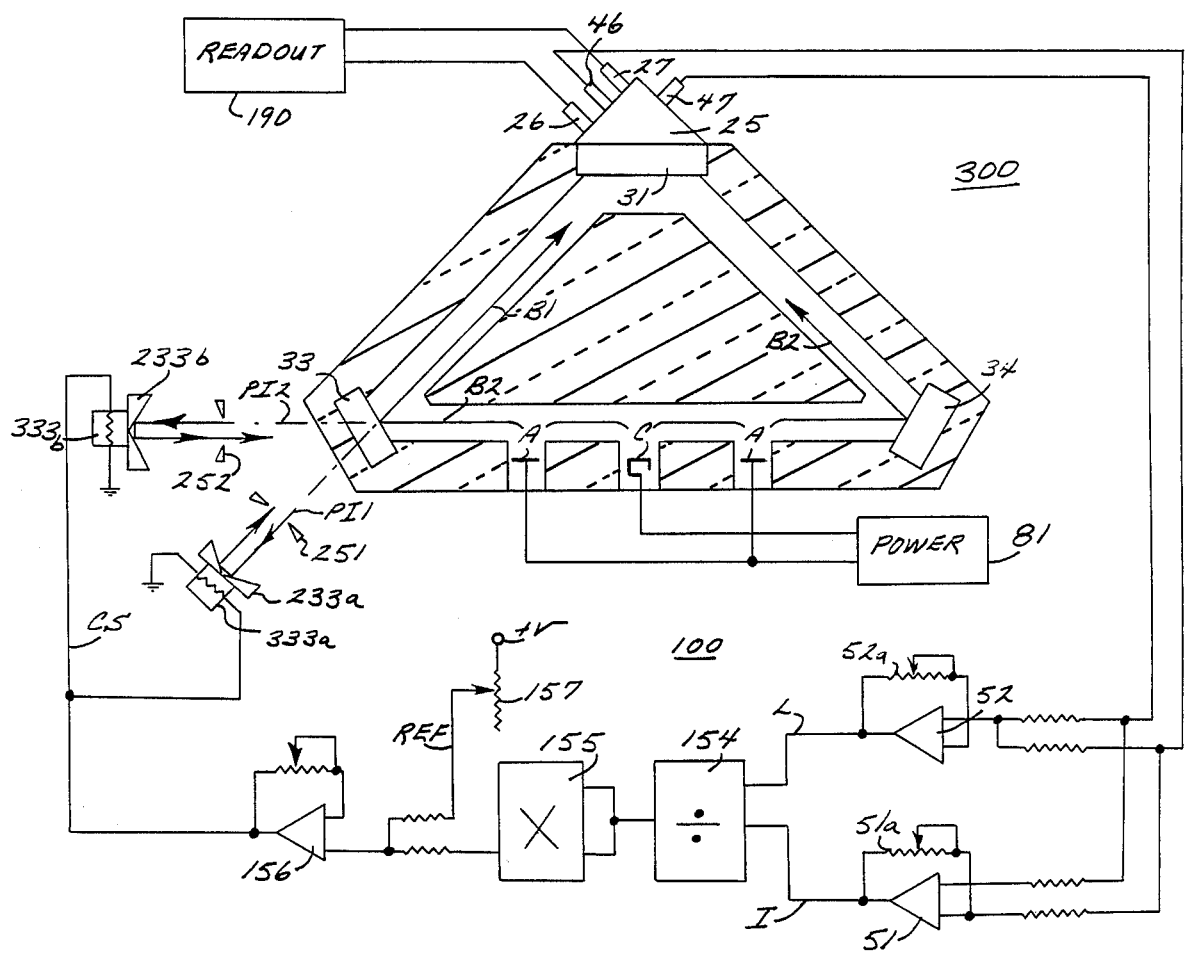
FIG. 3 is yet another schematic illustrating another implementation of an active compensation technique for correcting scale factor non-linearities.

In yet another implementation shown in FIG. 3 by the numeral 300 that include like components designated by like numerals, another control system is laid out to correct gain non-linearities by way of the ratio of the beam intensity difference and the intensity sum, and also including the phase difference E. In this implementation, however, instead of two moveable mirrors 33 and 34 with piezoelectric actuators, two retro-reflector mirrors 233a and 233b are used to retro-reflect the light beam back into the beam paths. The intensity of the retro-reflected beams are controlled by attenuators 251 and 252. Piezoelectric actuators are attached to mirrors 233a and 233b to adjust the phase of the retro-reflected beam back into the beam paths. The piezoelectric actuators are connected on a "push-pull" mode and are controlled by the phase angle E. The push-pull voltage is controlled by the phase angle E and will be set to desired phase angle (i.e. $E=0$ or $E=\pi/2$). The attenuators are adjusted to achieve zero difference intensity. Conversely, the attenuators can be adjusted individually to minimize the variation in the intensity $I_1$ and $I_2$, i.e. to minimize $i_1$ and $i_2$.

Obviously many modifications and changes may be made to the foregoing without departing from the spirit of the invention. It is therefore intended that the scope of the invention be determined solely on the claims appended hereto.

What is claimed is:

1. In a laser gyroscope characterized by a closed resonator cavity about a gain medium conformed to inject a first and second oppositely directed beam into said cavity, the improvement comprising:

sensing means operatively connected to said resonator cavity for sensing the intensity of said first and second beams and for producing a first and second intensity signal corresponding thereto;

control signal generating means connected to receive said first and second intensity signals for producing a control signal corresponding to the square of the difference between said first and second intensity signals divided by the square of the sum of said first and second intensity signals; and beam path correction means connected to receive said control signal for adjusting the path of said first and second beam in response thereto.

2. In a ring laser gyroscope characterized by a resonator cavity forming a path about a gain medium injecting first and second oppositely directed beams into said cavity and beat sensing means connected to sense the frequency difference between said first and second means, the improvement comprising:

intensity sensing means connected to said cavity for sensing the intensity of said first and second beams and for producing a first and second intensity signal indicative thereof; and correcting means connected to said beat sensing means and to receive said first and second intensity signals and for correcting said frequency difference by the square of the difference between said first and second intensity signals divided by the square of the sum of said first and second intensity signals.

* * * * *